May 20, 1930.　　　　A. H. SCHIRMER　　　　1,759,023

ELECTRICAL PROTECTIVE DEVICE

Filed Aug. 16, 1927

INVENTOR.
August H. Schirmer
BY
ATTORNEY

Patented May 20, 1930

1,759,023

UNITED STATES PATENT OFFICE

AUGUST H. SCHIRMER, OF NEWARK, NEW JERSEY, ASSIGNOR TO AMERICAN TELEPHONE AND TELEGRAPH COMPANY, A CORPORATION OF NEW YORK

ELECTRICAL PROTECTIVE DEVICE

Application filed August 16, 1927. Serial No. 213,269.

This invention relates to electrical protective devices, and particularly to devices characterized by means to restore them to their normal unoperated condition after they have operated.

A protective device having an air gap which breaks down at a predetermined potential has long been used in the telephone art for the protection of circuits from high voltages set up therein by sources extraneous to the circuits themselves. One of the difficulties experienced with a protector of this type arises from its occasional failure to restore itself to its normal non-operated condition after it has operated to provide a low resistance path to ground for the current set up by the interfering voltage. This failure of the protector to restore itself to its normal non-operated condition results in increased maintenance costs upon the circuit and also increases the length of time during which the circuit may be out of use. It has been found that failure of a protector to automatically restore itself occurs principally when the protector is required to drain an abnormally large current for a relatively long time. The continued flow of large currents causes a burning or fusing of the electrodes of the air gap, which effectively bridges the gap.

It is an object of this invention to provide a system for the protection of circuits against high voltages, which is characterized by the ability of the protector devices to automatically restore themselves to their normal non-operated condition after an electrical discharge has taken place through them.

Figure 1:
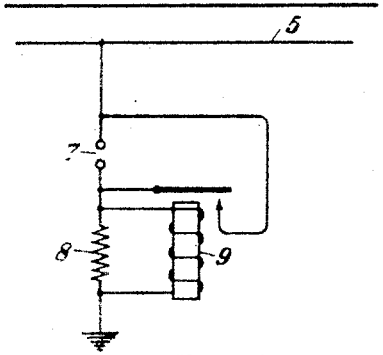
Figure 2:
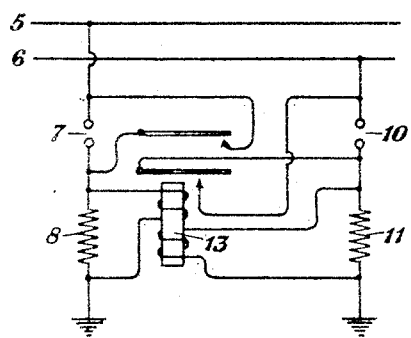

The invention will be more clearly understood from the following description, when considered in connection with the attached drawing, in which Figure 1 shows schematically a general form of one embodiment of the invention; Fig. 2 shows a form similar to Fig. 1 applied to a pair of conductors; and Fig. 3 indicates a form of the invention, generally similar to Fig. 1.

In the drawing, there are shown line conductors 5 and 6 which are to be protected against abnormal voltages to ground. These voltages are induced or otherwise set up in the line conductors from such extraneous sources as power lines or the like, which may extend adjacent to the line conductors. The conductors 5 and 6 have air gap protective devices 7 and 10, respectively connected thereto. These devices may be of any well-known type used for the protection of transmission conductors. Impedances 8 and 11 of any suitable character, are connected in series with the respective protective devices 7 and 10, and relays 9 are shunted across the impedances. These relays and impedances are of such type and so arranged that they remain operated until abnormal current is entirely removed from the line.

In the operation of the above outlined system for the protection of transmission circuits as applied to Fig. 1, voltage in excess of predetermined amount over the conductor 5 passes through the air gap or protective device 7, causing it to break down and permit the flow of current thereover to ground through impedance 8. The flow of current as outlined results in a voltage or potential drop across the impedance 8, causing the operation in a well understood manner of relay 9 which is connected in shunt of said impedance. The operation of relay 9 closes a circuit through its closed armature from ground and impedance 8 over the line 5. This short-circuits the protective device 7 and stops the arc across the air gap of said device and thereby prevents it from becoming permanently grounded. The relay and impedance being permanently connected in the ground circuit hold this short circuit until abnormal voltage and current ceases. When the abnormal voltage and current ceases, relay 9 releases, leaving the protective device and circuit in normal condition. In telephone lines with which the improved arrangement is particularly adapted to be used there is no appreciable voltage, and it is only induced thereon by power lines or by contact of the power lines with the telephone lines. Consequently, when the disturbance from power lines is removed, the relay 9 will release and return to normal, as there is not sufficient voltage on the telephone line, even through the low resistance path described, to affect said relay.

Fig. 2 illustrates a modification in which a double wound relay is employed. Excess voltage incoming over lines 5 and 6 passes through the respective protective devices 7 and 10 connected therewith. The current passes through the impedances 8 and 11, as the case may be, to ground. In passing through the impedance 8, the current causes a voltage or potenial drop across said impedances, which results in the operation of relay 13 through the upper winding thereof, which is connected in shunt of said impedance. The current, in passing through impedance 11, causes a voltage or potential drop across said impedance, which results in the operation of relay 13, by means of its lower winding, which is connected in shunt of the impedance 11. The operation of relay 13, by means of either of its windings, causes it to close a circuit through its upper armature from ground and impedance 8 to line 5, and through its lower armature from ground and impedance 8, to line 6. The protective devices 7 and 10 are thus short-circuited, and fusing by arcing their air gaps is prevented, thereby eliminating permanent grounding of the protective devices.

Figure 3:
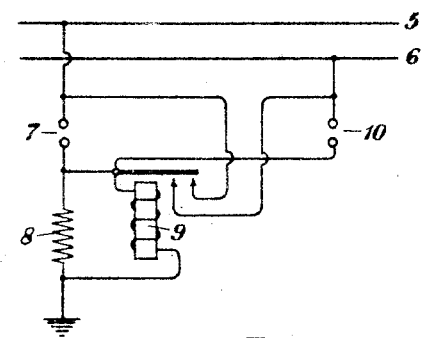

In Fig. 3, the protective devices 7 and 10 are connected, respectively, to the lines 5 and 6. Excess voltage over these lines causes current to flow through the respective protective devices 7 and 10, connected therewith, and through impedance 8 to ground. This current will cause, as previously mentioned in connection with the other arrangements disclosed, a voltage or potential drop across the impedance 8, resulting in the operation of relay 9, which is connected in shunt with the impedance. The operation of relay 9 closes a circuit through its armature, short-circuiting the protective devices 7 and 10. The closure of this circuit similarly to that described in connection with the other modifications, prevents the permanent grounding of the protective devices, and permits them and their associated circuits to be restored to their normal operating condition upon the cessation of the abnormal voltage.

While the arrangements of the invention have been illustrated as embodied in certain specific forms, which have been deemed desirable, it will be understood that they are capable of embodiment in many and widely varied forms without departing from the spirit of the invention, as defined in the appended claims. It will be further understood that while a relay has been shown for the purpose of providing a short circuit about the protective devices, a combination of relays and other auxiliary apparatus, such as rectifiers, may be substituted for this purpose.

What is claimed is:

1. In an electrical protective system, the combination with a telephone line circuit to be protected from voltages set up by an extraneous source, an air gap protective device connected with the line circuit and adjusted to operate at a predetermined voltage, a grounded impedance permanently in series with the protective device, and a relay connected with the line circuit in shunt of said impedance operated by the potential drop across said impedance caused by imposed voltages on the line circuit when exceeding any desired magnitude, said relay also short circuiting the protective device during the potential drop across said impedance, and said relay and said impedance being connected from the line circuit to ground through a path in short circuit of said protective device during the entire interval the excess voltage is on the line circuit to prevent excessive heating of the winding of the relay and the protective device and the permaent grounding of the protective device.

2. In an electrical protective system, the combination with a plurality of telephone line circuits to be protected from excess voltages set up by an extraneous source, of air gap protective devices connected with each circuit to provide a path to ground for voltages exceeding a predetermined limit over each circuit, a grounded impedance in series with each protective device, and a relay common to the protective devices and associated impedances responsive to the potential drop of excess voltage thereover, said relay having means to provide a drainage path to ground for the circuit on which the excess voltage is induced and to short circuit the protective devices associated with all circuits, and maintain such short circuit for the protective devices associated with all circuits during the entire period the excess voltage is on the lines, said impedances preventing excessive heating of the winding of the relay and said protective devices and the permanent grounding of said devices.

In testimony whereof, I have signed my name to this specification this 15th day of August, 1927.

AUGUST H. SCHIRMER.